(12) United States Patent
Bai et al.

(10) Patent No.: US 8,265,984 B2
(45) Date of Patent: Sep. 11, 2012

(54) METHOD AND APPARATUS FOR UNIFIED OPTIMIZATION MODEL FOR RETAIL NETWORK CONFIGURATION

(75) Inventors: Xin Xin Bai, Beijing (CN); Jin Dong, Beijing (CN); Ta-Hsin Li, Danbury, CT (US); Ming Xie, Beijing (CN); Wen Jun Yin, Beijing (CN); Bin Zhang, Beijing (CN); Cindy Q. Zhang, Shenzhen (CN)

(73) Assignee: International Business Machines Corporation, Armonk, NY (US)

( * ) Notice: Subject to any disclaimer, the term of this patent is extended or adjusted under 35 U.S.C. 154(b) by 1161 days.

(21) Appl. No.: 12/117,540

(22) Filed: May 8, 2008

(65) Prior Publication Data
US 2009/0281869 A1  Nov. 12, 2009

(51) Int. Cl.
*G06Q 30/00* (2012.01)
(52) U.S. Cl. ............... 705/7.34; 705/7.29; 705/7.31; 705/7.23
(58) Field of Classification Search ......... 705/7.11–7.42
See application file for complete search history.

(56) References Cited

U.S. PATENT DOCUMENTS

| | | | |
|---|---|---|---|
| 7,302,410 B1 * | 11/2007 | Venkatraman et al. ......... 705/35 |
| 7,440,903 B2 * | 10/2008 | Riley et al. ..................... 705/1.1 |
| 7,752,067 B2 * | 7/2010 | Fotteler et al. ................ 705/7.29 |
| 7,895,067 B2 * | 2/2011 | Ramakrishnan .............. 705/7.11 |
| 7,937,286 B2 * | 5/2011 | Newman et al. .............. 705/7.31 |
| 8,010,399 B1 * | 8/2011 | Bruce et al. ................... 705/7.29 |
| 2002/0087384 A1 | 7/2002 | Neifeld |
| 2003/0033195 A1 * | 2/2003 | Bruce et al. ...................... 705/10 |
| 2003/0055707 A1 | 3/2003 | Busche |
| 2004/0044578 A1 | 3/2004 | Kim et al. |
| 2004/0098296 A1 * | 5/2004 | Bamberg et al. ................ 705/10 |
| 2005/0108070 A1 * | 5/2005 | Kelly et al. ........................ 705/5 |
| 2006/0069606 A1 * | 3/2006 | Kaczkowski et al. ........... 705/10 |
| 2007/0027745 A1 | 2/2007 | Ouimet |
| 2008/0294996 A1 | 11/2008 | Hunt et al. |
| 2009/0012803 A1 * | 1/2009 | Bishop et al. ..................... 705/1 |

OTHER PUBLICATIONS

U.S. Office Action mailed Mar. 16, 2011 in related U.S. Appl. No. 12/017,673.
U.S. Office Action mailed Aug. 2, 2011 in related U.S. Appl. No. 12/017,673.

\* cited by examiner

*Primary Examiner* — R. David Rines
(74) *Attorney, Agent, or Firm* — Scully, Scott, Murphy & Presser, P.C.

(57) ABSTRACT

A method and system for integrating multiple factors into a unified optimization model for retail network configuration, in one aspect, obtains input data for modeling store configuration. The input data may include demand of each merchandise category from each customer segment in each facility, geographic distribution of stores in an area, current revenue of stores, and physical cost of reconfiguring stores. A trade area is generated as a function of store location, store format, and store capacity. The method and system also generates trade area demand summation representing predicted total demand of all stores for all merchandise categories for all customer segments in the trade area, as a function of store location, store format, store capacity, merchandise category, and customer segment associated with the trade area. An objective function is constructed as a function of said trade area demand summation, current revenue of stores, and physical cost of reconfiguring stores.

17 Claims, 4 Drawing Sheets

METHOD AND APPARATUS FOR UNIFIED OPTIMIZATION MODEL FOR RETAIL NETWORK CONFIGURATION

CROSS-REFERENCE TO RELATED APPLICATIONS

The present application is related to co-pending and co-owned U.S. patent application Ser. No. 12/017,673 entitled, METHOD AND APPARATUS FOR END-TO-END RETAIL STORE SITE OPTIMIZATION, filed Jan. 22, 2008. That application is incorporated herein by reference in its entirety.

FIELD OF THE INVENTION

The present application generally relates to mathematical and optimization modeling, and more particularly to integrating multiple factors into a unified optimization model for retail network configuration.

BACKGROUND OF THE INVENTION

Retail outlets such as stores, banking branches, gas stations, or like are considered important but costly channels for many retailers to win in the customer-centric marketplace. Generally, retail outlets refer to the places where products can be sold to customers. Retailers are the companies or enterprises, which have many retail outlets. How to configure a retail network is a critical issue for retailers to address, especially in competitive markets. Different factors such as location, store formats, types of customers, etc. have been taken into account when configuring a retail network. Known methodologies, however, deal with those factors in separate models or systems.

For example, to select a new site for establishing a store, the known methodologies first determine new locations, then determine the formats of the new retail outlets. For existing store reconfiguration, the known methodologies first determine the change of locations, then determine the change of formats separately. Existing methodologies also decide on the capacity, target merchandise, and target customer for a given store, separately. The known or existing methodologies only configure the factors in separate systems and furthermore use conventional data, for example, geographic data and population number in the trade area.

Accordingly, it is desirable to have a method and system for jointly and/or simultaneously considering different factors when configuring retail networks. It is also desirable to use novel types of data input when configuring retail networks.

BRIEF SUMMARY OF THE INVENTION

A method, system and apparatus for integrating multiple factors into a unified optimization model for retail network configuration are provided. The method, in one aspect, may comprise obtaining input data for modeling store configuration. The input data may include at least demand of each merchandise category from each customer segment in each facility, geographic distribution of stores in an area, current revenue of stores, and physical cost of reconfiguring stores. The method may also comprise generating a trade area as a function of store location, store format, and store capacity and generating trade area demand summation representing predicted total demand of all stores for all merchandise categories for all customer segments in the trade area. The predicted total demand may be determined as a function of store location, store format, store capacity, merchandise category, and customer segment associated with the trade area. The method may further comprise constructing an objective function. The objective function is a function of said trade area demand summation, said current revenue of stores, and said physical cost of reconfiguring stores, and optimizes store network configuration.

A system for integrating multiple factors into a unified optimization model for retail network configuration, in one aspect, may comprise data input module operable to execute on a processor. The data input module may be further operable to obtain input data for modeling store configuration, and the input data may include at least demand of each merchandise category from each customer segment in each facility, geographic distribution of stores in an area, current revenue of stores, and physical cost of reconfiguring stores. An optimization objective function integration module is operable to generate a trade area as a function of store location, store format, and store capacity. The optimization objective function integration module may be further operable to generate trade area demand summation representing predicted total demand of all stores for all merchandise categories for all customer segments in the trade area. The predicted total demand may be determined as a function of store location, store format, store capacity, merchandise category, and customer segment associated with the trade area. The optimization objective function integration module may be further operable to construct an objective function, said objective function being a function of said trade area demand summation, said current revenue of stores, and said physical cost of reconfiguring stores. The objective function optimizes store network configuration.

A program storage device readable by a machine, tangibly embodying a program of instructions executable by the machine to perform a method of integrating multiple factors into a unified optimization model for retail network configuration may be also provided.

Further features as well as the structure and operation of various embodiments are described in detail below with reference to the accompanying drawings. In the drawings, like reference numbers indicate identical or functionally similar elements.

DETAILED DESCRIPTION

A method and system of the present disclosure in one embodiment integrates a plurality of factors into a single objective function for joint optimization of retail network configuration.

The method and system of the present disclosure in one embodiment can model the configuration and reconfiguration tasks as a joint optimization problem with a single objective function. The joint optimization problem may be solved by global optimization algorithms.

In one embodiment, the method and system of the present disclosure also defines a novel type of input data necessary for the integration of the plurality of factors. This disclosure defines a novel type of input data in which the demand of merchandise is described jointly by merchandise category, customer segment, and geographic-demographic entity.

In one embodiment of the method and system of the present disclosure, a plurality of factors, location, format, capacity, target customer, and target merchandise, are considered jointly and/or simultaneously rather than individually or separately. The multi-factor single-objective approach makes more efficient use of information and achieves improved optimization.

In order to integrate those factors in one optimization function, following issues may be considered:
1. What are the relationships among the factors? How they influence each other?
2. How to define an objective function that can incorporate all five factors?
3. What input data are necessary to support the modeling?
4. How to make the optimization problem solvable?

Figure 1:
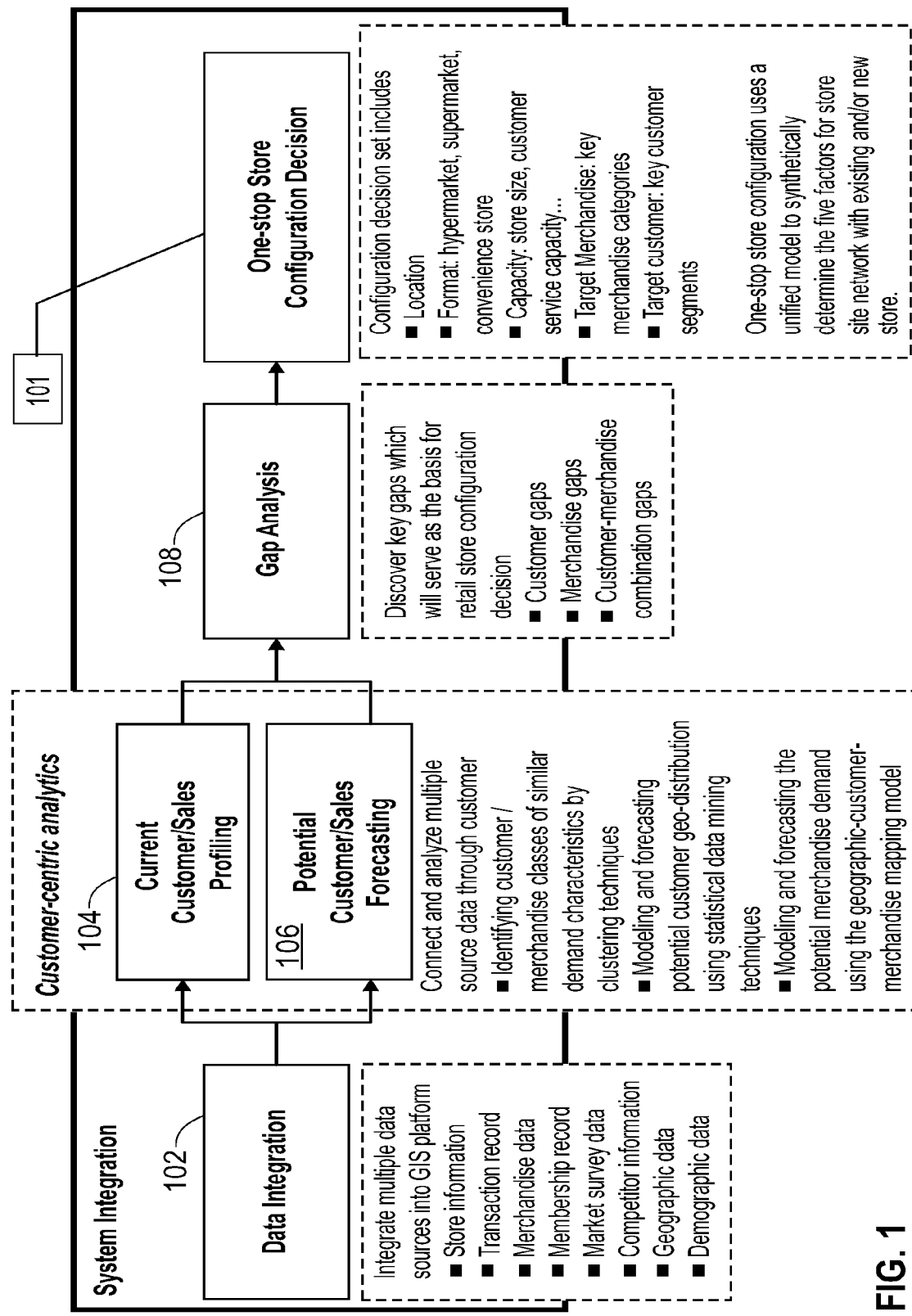
FIG. 1 shows Retail Store Site Optimization (ROSS) methodology and the use of the Integration of Multiple Factors in the methodology in one embodiment of the present disclosure.

FIG. 1 shows a methodology of a retail store network configuration solution, referred to as Retail Store Site Optimization (ROSS), where integrating the multiple store factors for joint optimization is a component of One Stop Configuration Decision (101). At 102, Data Integration module or functional component, integrates multiple data sources into a platform such as geographic information system (GIS) platform. Multiple data sources may include store information, transaction record, merchandise data, membership record, market survey data, competitor information, geographic data, demographic data. Customer-centric analysis may be performed using the multiple data sources, for instance, current customers and related or associated sales are profiled at 104. At 106, potential customers and associated sales may be forecasted. Customer-centric analysis performed at 104 and 106 may include identifying customer and merchandise classes or similar demand characteristics by clustering techniques; modeling and forecasting potential customer geo-distribution using statistical data mining techniques; and modeling and forecasting the potential merchandise demand using the geographic-customer-merchandise mapping model. At 108, gaps associated with customer, merchandise and/or customer-merchandise combination are identified, if any, from the analysis performed at 104 and/or 106. Those gaps may serve as a basis for retail store configuration decisions. At 101, a unified model is used to synthetically determine location, format, capacity, target merchandise, and target customer for store site network with existing and/or new store. Briefly, format refers to the format of the store, for example, hypermarket, supermarket, convenience store, etc.; capacity refers to store size, customer service capacity, etc.; target merchandise refers to merchandise categories; and target customer refers to customer segments, for example, by demographics, etc.

The following illustrates optimization variables used in one embodiment in an objective function for optimizing retail store site configuration, also shown below.

Optimization Variable: $\{S_i=(L_i,F_i,P_i,M_i,C_i)|i=1,2,\ldots,N\}$, where
  $S_i=(L_i,F_i,P_i,M_i,C_i)$: Configuration of the i-th outlet. N: total number of stores including existing stores and new outlets.
  $L_i$: location of i-th outlet, can be a coordinate value
  $F_i$: format of i-th outlet, can be an element of {hypermarket, supermarket, convenience store}
  $P_i$: capacity of i-th outlet, can be described as the size of the outlet, e.g. 6000 square meters
  $M_i=(n_1,n_2,\ldots,n_M)$: recommended target merchandise categories in i-th outlet
  $C_i=(b_1,b_2,\ldots,b_K)$: recommended target customer segments in i-th outlet Optimization objective:

$$\max \sum_{i=1}^{N} \{P(S_i) - V_i - L(S_i, S_{i0})\}, \text{ where}$$

$P(S_i)$: predicted demand of i-th outlet with configuration.
$V_i$: existing sales volume of i-th outlet.
$L(S_i, S_{i0})$: operation cost of transforming i-th outlet's existing configuration to recommended configuration.

$$P(S_i) = \sum_{g \in TA(L_i, F_i, P_i)} \sum_{k \in C_i} \sum_{j \in M_i} D(g, b_k, n_j), \text{ where}$$

$D(g,b_k,n_j)$ the predicted demand of merchandise category j from customer segment k in geographic-demographic entity g
$TA(L_i,F_i,P_i)$: the trade area of i-th outlet determined by its location $L_i$, format $F_i$, and capacity $P_i$.

The above optimization objective maximizes the total profit of the store network.

In Retail Outlet network configuration problems, the optimization variables can be described as a set of configuration factors: $\{S_i=(L_i,F_i,P_i,M_i,C_i)|i=1,2,\ldots,N\}$, where $S_i=(L_i,F_i,P_i,M_i,C_i)$ is the configuration of the i-th store, and N is the total number of stores including new stores and existing stores which need reconfiguration. $L_i$ is the location or position of the i-th store. $F_i$ is the format of the i-th store, which can be chosen in the set {hypermarket, supermarket, convenience-store}. $P_i$ is the capacity of the i-th store, which can be described by store size e.g. 6000 square meters. $M_i=(n_1, n_2,\ldots,n_M)$ is the set of recommended target categories in the i-th store. $C_i=(b_1,b_2,\ldots,b_K)$ is the set of recommended target customer classes of the i-th store.

Figure 2:
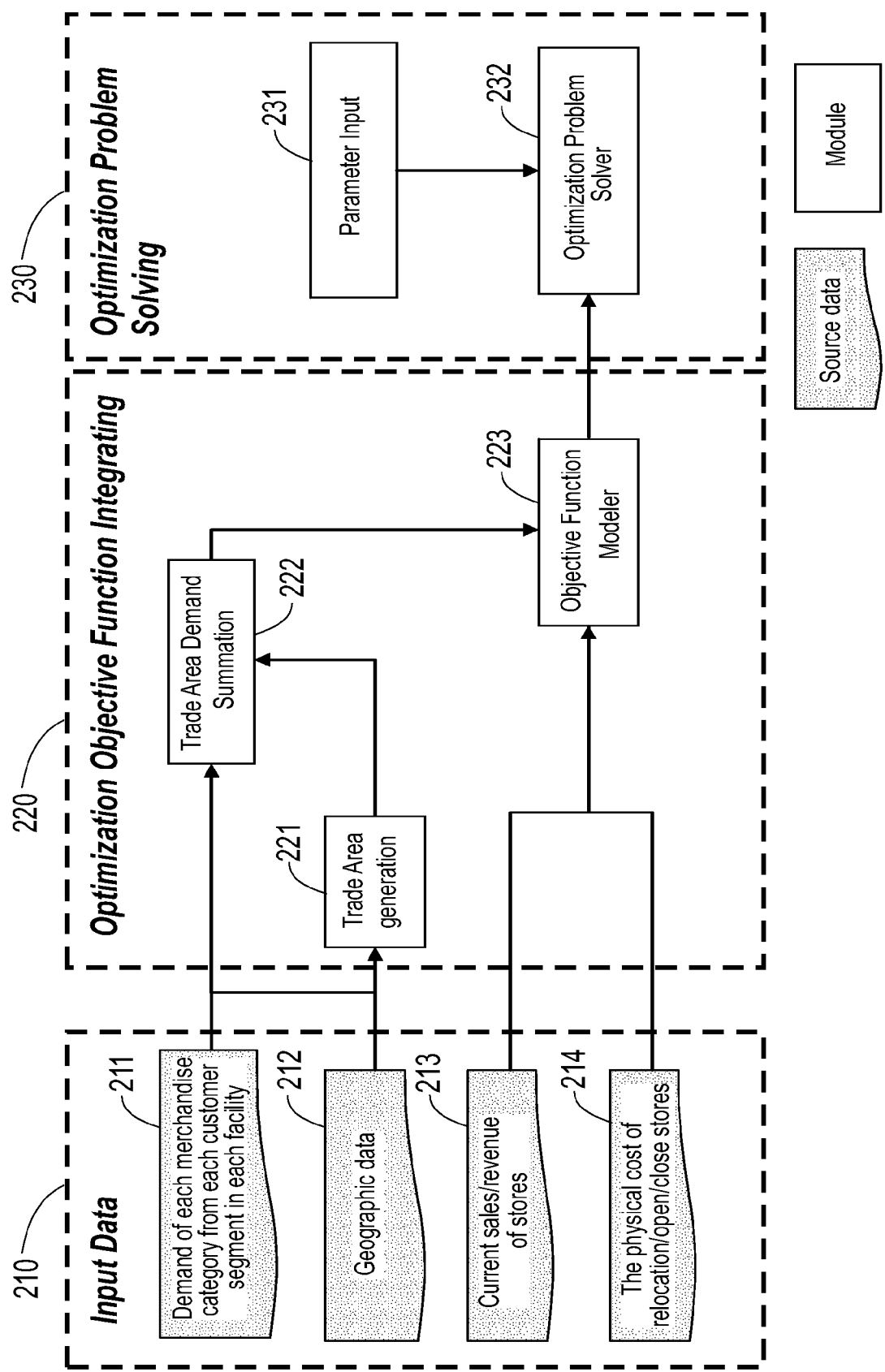
FIG. 2 shows a system design of an embodiment of Integrating Multiple Factors into a Unified Optimization Model for Retail Network Configuration.

FIG. 2 is an architectural diagram illustrating examples of functional components of a system of the present disclosure in one embodiment. A system of Integrating Multiple Factors into a Unified Optimization Model for Retail Network Configuration may comprise three functional modules or components: Data Input 210, Optimization Objective Function Integrating 220 and Optimization Problem Solving 230. The functional modules shown in FIG. 2 may be executed at step 101 shown in FIG. 1.

In Data Input (210) module, four types of input data which considerably influence the decision making are taken into modeling in one embodiment: Demand of each merchandise category from each customer segment in each facility (211), Geographic data (212), Current sales/revenue of stores (213) and the physical cost of store reconfiguration operations (relocation/open/close stores) (214).

The demand of each merchandise category from each customer segment in each facility (211) is represented as term $D(g,b_k,n_j)$, where $b_k$ is the k-th customer class, $n_j$ is the j-th merchandise category, and g is a facility. The whole phrase $D(g,b_k,n_j)$ is the predicted demand of merchandise category j from customer class k in facility g. In one embodiment, $D(g,b_k,n_j)$ is used as an input data in integrating the five factors into single objective function.

The geographic data (212) describes geographic distribution of facilities, that is, the positions of facilities such as residential buildings, office buildings, companies, shopping stores, and like. The geographic data (212) is used as a basis for generating trade area (221), and querying what facilities are in a trade area (222).

The current sales/revenue of store (213) is represented by $V_i$, which is the existing sales volume of the i-th store, and it can be zero for new store. It can be easily obtained from the finance report of the store or computed from the transactions in the store.

The physical cost of store reconfiguration operations (re-location/open/close stores) (214) is represented by $L(S_i,S_{i0})$. It is the total operation cost of transforming the i-th store's existing configuration $S_{i0}$ to recommended configuration $S_i$. If the i-th store is a new store, then $S_{i0}$=null, and $L(S_i,S_{i0})$ is the cost only for opening a new store. Otherwise, $L(S_i,S_{i0})$ comprises the cost of both closing the existing store and opening the new store. If location does not change, then $L(S_i,S_{i0})$ equals the cost of changing to other configurations. $S_i$ is chosen from the set of store configuration set $\{S_i=(L_i,F_i,P_i,M_i,C_i)|i=1,2,\ldots,N\}$ mentioned above. $L(S_i,S_{i0})$ can be pre-defined empirically using a mapping table from configuration $(S_i,S_{i0})$ to cost L.

Optimization Objective Function Integrating (220) module in embodiment constructs an optimization objective function that can incorporate all five factors, i.e., location, format, capacity, target merchandise, target customer. The integration process may include the following three steps or modules that perform the steps: Trade Area Generation (221), Trade Area Demand Summation (222) and Objective Function Modeler (223).

Trade Area Generation (221) creates trade area from the three parameters store location $L_i$, format $F_i$, and capacity $P_i$.

Figure 3:
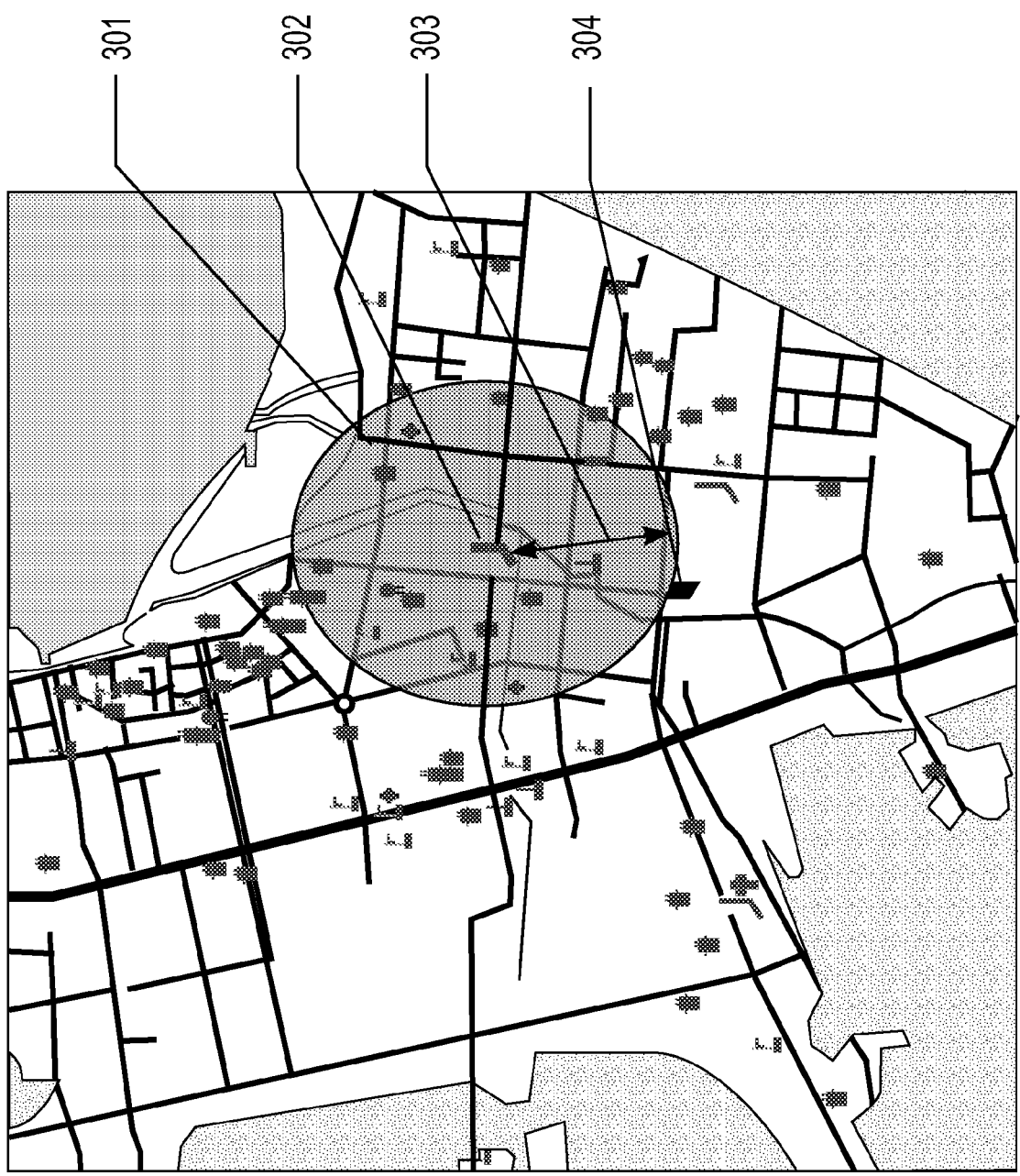
FIG. 3 shows an exemplary trade area of a store in one embodiment of the present disclosure.

FIG. 3 shows an example of a trade area (301) of a store in one embodiment of the present disclosure. The trade area center (302) is determined by the store location, the radius (303) is determined by store format, and the "thickness" (304) is determined by store capacity. FIG. 3 illustrates that the most-used trade area $TA(L_i,F_i,P_i)$ is disk-like area (301). Its center point (302) is represented by a coordinate value, which can be same as location $L_i$. Its radius (303) is a value determined by store format. For example, in a China city, if the format is hypermarket, the radius can be 2 kilometers. If the format is supermarket, the radius can be 1 kilometer. If the format is convenient-store, the radius can be 500 meters. The mapping from format to radius can be predetermined, for example, empirically obtained. It is noted that the mapping may be different in various cities or countries. Its thickness (304) representing the penetration rate is a value from 0% to 100% determined by store capacity. For example, in a China city, when the format is supermarket, if the store capacity (size) is more than 3000 square meters, the thickness can be 70%. If the store capacity is more than 1500 square meters, the thickness can be 50%. The mapping rule from capacity to thickness can also be predetermined, for example, empirically obtained, and it may be different under different store formats in various cities.

Figure 4:
FIG. 4 shows examples of configuration of two trade areas.

FIG. 4 shows examples of configuration of two trade areas. The disk-like areas with deeper color have larger thickness. FIG. 4 shows two types of trade areas with different location, format and capacity. The thickness is represented by the depth of color or intensity of shading. Trade area 401 is smaller than trade area 402, but its thickness is larger than trade area 402. In one aspect, a user interface module such as a graphical user interface module may be integrated into the system of the present disclosure to allow a user with access to displays or views such as those shown in FIG. 3 and FIG. 4.

Referring back to FIG. 2, Trade Area Demand Summation (222) predicts the total demand $P(S_i)$ of the i-th store with the configuration $S_i$. $P(S_i)$ is defined as the total demand of all facilities of all merchandise categories from all target customers in the trade area:

$$P(S_i) = \sum_{g \in TA(L_i,F_i,P_i)} \sum_{k \in C_i} \sum_{j \in M_i} D(g, b_k, n_j).$$

It integrates all the five factors $L_i$, $F_i$, $P_i$, $M_i$ and $C_i$ of the i-th store.

$$\sum_{j \in M_i} D(g, b_k, n_j)$$

describes the total predicted demand of gathering all the recommended target merchandise together of the k-th recommended target customer class in a facility g.

$$\sum_{k \in C_i} \sum_{j \in M_i} D(g, b_k, n_j)$$

describes the total predicted demand for all the recommended target categories and all the target customer classes in the facility g;

$$\sum_{g \in TA(L_i,F_i,P_i)} \sum_{k \in C_i} \sum_{j \in M_i} D(g, b_k, n_j)$$

describes the summation of all total demands of all facilities in the trade area. In order to find what facilities are in the trade area, the geographic data including the positions of facilities should be used.

In one embodiment, Objective Function Modeler (223) should be executed after trade area generation (221) and trade area demand summation (222). In order to give an optimization objective function to describe the total profit of the store network precisely, the current sales/revenue volume and the operation to relocation/open/close a store may also be taken into consideration. For the i-th store, the final profit may be computed from the total current demand $P(S_i)$, the current sales/revenue volume $V_i$, and the reconfiguration operation cost $L(S_i,S_{i0})$. That is, the profit equals $P(S_i)-V_i-L(S_i,S_{i0})$. For the whole store network, $$\sum_{i=1}^{N} \{P(S_i) - V_i - L(S_i, S_{i0})\}$$

describes its total profit. So that the mathematical problem is:

$$\max \sum_{i=1}^{N} \{P(S_i) - V_i - L(S_t, S_{i0})\}.$$

Optimization Problem Solving (230) determines optimal solution for store network configuration. The optimization objective function constructed in optimization objective function integration (220) module leads the optimization problem to a maximum converge location problem (MCLP). Global optimization algorithms, such as Genetic Algorithm, Tabu Search, etc, can be used to solve this problem. The global optimization algorithms may comprise the optimization problem solver (232), and the needed or desired parameters can be inputted by user in Parameter Input component (231).

Various aspects of the present disclosure may be embodied as a program, software, or computer instructions embodied in a computer or machine usable or readable medium, which causes the computer or machine to perform the steps of the method when executed on the computer, processor, and/or machine.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method for integrating multiple factors into a unified optimization model for retail network configuration, comprising:
    obtaining input data for modeling store configuration, said input data including at least demand of each merchandise category from each customer segment in each facility, geographic distribution of stores in an area, current revenue of stores, and physical cost of reconfiguring stores;
    generating a trade area as a function of store location, store format, and store capacity;
    generating, by a processor, trade area demand summation representing predicted total demand of all stores for all merchandise categories for all customer segments in the trade area, said predicted total demand determined as a function of store location, store format, store capacity, merchandise category, and customer segment associated with the trade area; and
    constructing, by the processor, an objective function, said objective function being a function of said trade area demand summation, said current revenue of stores, and said physical cost of reconfiguring stores, said objective function for optimizing store network configuration, wherein the objective function includes, $$\max \sum_{i=1}^{N} \{P(S_i) - V_i - L(S_t, S_{i0})\},$$

wherein $P(S_i)$ represents predicted demand of i-th outlet with configuration, $V_i$ is existing sales volume of i-th outlet, $L(S_t,$ $S_{i0})$ is operation cost of transforming i-th outlet's existing configuration to recommended configuration, wherein $$P(S_i) = \sum_{g \in TA(L_i, F_i, P_i)} \sum_{k \in C_i} \sum_{j \in M_i} D(g, b_k, n_j),$$

wherein $D(g,b_k,n_j)$ represents predicted demand of merchandise category j from customer segment k in geographic-demographic entity g, $TA(L_i,F_i,P_i)$ represents a trade area of i-th outlet determined by its location $L_i$, format $F_i$, and capacity $P_i$.

2. The method of claim 1, wherein said objective function maximizes total profit of the store network by simultaneously integrating the store location, the store format, the store capacity, the merchandise category, and the customer segment associated with the trade area, of all stores in the store network as optimization variables.

3. The method of claim 1, wherein the step of generating trade area demand summation includes:
    determining predicted demand of a merchandise category for a customer segment of a store in the trade area;
    determining total predicted demand of all recommended target merchandise for a customer segment of a store in the trade area from said predicted demand of a merchandise category for a customer segment of a store in the trade area;
    summing said total predicted demand for all recommended target merchandise for a customer segment of a store in the trade area over all customer segments is said store; and
    summing said summed total predicted demand for all recommended target merchandise for all customer segments for all stores in the trade area.

4. The method of claim 1, wherein said physical cost of reconfiguring stores includes cost only for opening a new store.

5. The method of claim 1, wherein said physical cost of reconfiguring stores includes cost of transforming store's existing configuration to a recommended configuration.

6. A system for integrating multiple factors into a unified optimization model for retail network configuration, comprising:
    a processor;
    data input module operable to execute on the processor, said data input module further operable to obtaining input data for modeling store configuration, said input data including at least demand of each merchandise category from each customer segment in each facility, geographic distribution of stores in an area, current revenue of stores, and physical cost of reconfiguring stores; and optimization objective function integration module operable to execute on the processor and to generate a trade area as a function of store location, store format, and store capacity, said optimization objective function integration module further operable to generate trade area demand summation representing predicted total demand of all stores for all merchandise categories for all customer segments in the trade area, said predicted total demand determined as a function of store location, store format, store capacity, merchandise category, and customer segment associated with the trade area, said optimization objective function integration module further operable to construct an objective function, said objective function being a function of said trade area demand summation, said current revenue of stores, and said physical cost of reconfiguring stores, said objective function for optimizing store network configuration, wherein the objective function includes $$\max \sum_{i=1}^{N} \{P(S_i) - V_i - L(S_t, S_{i0})\},$$

wherein $P(S_i)$ represents predicted demand of i-th outlet with configuration, $V_i$ is existing sales volume of i-th outlet, $L(S_i, S_{i0})$ is operation cost of transforming i-th outlet's existing configuration to recommended configuration, wherein $$P(S_i) = \sum_{g \in TA(L_i, F_i, P_i)} \sum_{k \in C_i} \sum_{j \in M_i} D(g, b_k, n_j),$$

wherein $D(g,b_k,n_j)$ represents predicted demand of merchandise category j from customer segment k in geographic-demographic entity g, $TA(L_i,F_i,P_i)$ represents a trade area of i-th outlet determined by its location $L_i$, format $F_i$, and capacity $P_i$.

7. The system of claim 6, further including:
an optimization problem solving module operable to solve said objective function.

8. The system of claim 7, wherein said objective function is solved using Genetic Algorithm or Tabu Search algorithm or combinations thereof.

9. The system of claim 6, wherein said trade area demand summation is generated by determining predicted demand of a merchandise category for a customer segment of a store in the trade area, determining total predicted demand of all recommended target merchandise for a customer segment of a store in the trade area from said predicted demand of a merchandise category for a customer segment of a store in the trade area, summing said total predicted demand for all recommended target merchandise for a customer segment of a store in the trade area over all customer segments is said store, and summing said summed total predicted demand for all recommended target merchandise for all customer segments for all stores in the trade area.

10. The system of claim 6, wherein said physical cost of reconfiguring stores includes cost only for opening a new store.

11. The system of claim 6, wherein said physical cost of reconfiguring stores includes cost of transforming store's existing configuration to a recommended configuration.

12. The system of claim 6, further including:
a user interface module operable to present a view displaying store site locations configured using said objective function.

13. A non-transitory program storage device readable by a machine, tangibly embodying a program of instructions executable by the machine to perform a method of integrating multiple factors into a unified optimization model for retail network configuration, comprising:
obtaining input data for modeling store configuration, said input data including at least demand of each merchandise category from each customer segment in each facility, geographic distribution of stores in an area, current revenue of stores, and physical cost of reconfiguring stores;
generating a trade area as a function of store location, store format, and store capacity;
generating trade area demand summation representing predicted total demand of all stores for all merchandise categories for all customer segments in the trade area, said predicted total demand determined as a function of store location, store format, store capacity, merchandise category, and customer segment associated with the trade area; and
constructing an objective function, said objective function being a function of said trade area demand summation, said current revenue of stores, and said physical cost of reconfiguring stores, said objective function for optimizing store network configuration
wherein the objective function includes $$\max \sum_{i=1}^{N} \{P(S_i) - V_i - L(S_t, S_{i0})\},$$

wherein $P(S_i)$ represents predicted demand of i-th outlet with configuration, $V_i$ is existing sales volume of i-th outlet, $L(S_i, S_{i0})$ is operation cost of transforming i-th outlet's existing configuration to recommended configuration, and wherein $$P(S_i) = \sum_{g \in TA(L_i, F_i, P_i)} \sum_{k \in C_i} \sum_{j \in M_i} D(g, b_k, n_j),$$

wherein $D(g,b_k,n_3)$ represents predicted demand of merchandise category j from customer segment k in geographic-demographic entity g, $TA(L_i,F_i,P_i)$ represents a trade area of i-th outlet determined by its location $L_i$, format $F_i$, and capacity $P_i$.

14. The program storage device of claim 13,
wherein said objective function maximizes total profit of the store network by simultaneously integrating the store location, the store format, the store capacity, the merchandise category, and the customer segment associated with the trade area, of all stores in the store network as optimization variables.

15. The program storage device of claim 13, wherein the step of generating trade area demand summation includes:
determining predicted demand of a merchandise category for a customer segment of a store in the trade area;
determining total predicted demand of all recommended target merchandise for a customer segment of a store in the trade area from said predicted demand of a merchandise category for a customer segment of a store in the trade area;
summing said total predicted demand for all recommended target merchandise for a customer segment of a store in the trade area over all customer segments is said store; and
summing said summed total predicted demand for all recommended target merchandise for all customer segments for all stores in the trade area.

16. The program storage device of claim 13, wherein said physical cost of reconfiguring stores includes cost only for opening a new store.

17. The program storage device of claim 13, wherein said physical cost of reconfiguring stores includes cost of transforming store's existing configuration to a recommended configuration.

* * * * *